US012143793B2

(12) United States Patent
Yu et al.

(10) Patent No.: US 12,143,793 B2
(45) Date of Patent: Nov. 12, 2024

(54) DIAPHRAGM FOR HIGH PRESSURE WATERPROOF MICROSPEAKER AND HIGH PRESSURE WATERPROOF MICROSPEAKER INCLUDING THE SAME

(71) Applicant: EM-TECH Co., Ltd., Gyeongsangnam-do (KR)

(72) Inventors: Byung Min Yu, Seoul (KR); Ji Young Lee, Gyeongsangnam-do (KR)

(73) Assignee: EM-TECH Co., Ltd., Gyeongsangnam-do (KR)

( * ) Notice: Subject to any disclaimer, the term of this patent is extended or adjusted under 35 U.S.C. 154(b) by 179 days.

(21) Appl. No.: 17/986,979

(22) Filed: Nov. 15, 2022

(65) Prior Publication Data

US 2023/0156406 A1 May 18, 2023

(30) Foreign Application Priority Data

Nov. 17, 2021 (KR) ........................ 10-2021-0158693

(51) Int. Cl.
*H04R 9/02* (2006.01)
*H04R 1/44* (2006.01)
*H04R 7/18* (2006.01)

(52) U.S. Cl.
CPC ............... *H04R 9/025* (2013.01); *H04R 1/44* (2013.01); *H04R 7/18* (2013.01)

(58) Field of Classification Search
CPC ............. H04R 9/025; H04R 1/44; H04R 7/18
USPC .......................................................... 381/412
See application file for complete search history.

(56) References Cited

U.S. PATENT DOCUMENTS

| | | | | |
|---|---|---|---|---|
| 7,360,626 B2 * | 4/2008 | Sahyoun | H04R 7/122 | 181/165 |
| 2009/0185710 A1 * | 7/2009 | Sun | H04R 9/043 | 381/413 |
| 2011/0299718 A1 * | 12/2011 | Williamson | H04R 7/20 | 381/423 |

(Continued)

FOREIGN PATENT DOCUMENTS

| | | |
|---|---|---|
| JP | 2011139254 A | 7/2011 |
| KR | 20150137517 A | 12/2015 |
| KR | 101622156 B1 | 5/2016 |

(Continued)

*Primary Examiner* — Sean H Nguyen
(74) *Attorney, Agent, or Firm* — Murphy, Bilak & Homiller, PLLC

(57) ABSTRACT

Provided are a diaphragm for a high water pressure waterproof microspeaker and a high pressure waterproof microspeaker including the same. The diaphragm for a high pressure waterproof microspeaker, which is provided in a microspeaker to reproduce sound, includes a center diaphragm and a side diaphragm, includes a center diaphragm attachment portion having a ring shape with a perforated center overall and attached to an outer periphery of the center diaphragm, a frame attachment portion attached to a frame, and a dome portion located between the center diaphragm attachment portion and the frame attachment portion and protruding upwardly or downwardly. The center diaphragm attachment portion of the side diaphragm includes an upper attachment portion attached to an upper surface of the center diaphragm and a lower attachment portion attached to a lower surface of the center diaphragm.

11 Claims, 6 Drawing Sheets

(56) References Cited

U.S. PATENT DOCUMENTS

2022/0210574 A1* 6/2022 Kim .......................... H04R 7/04

FOREIGN PATENT DOCUMENTS

| | | | |
|---|---|---|---|
| KR | 101889315 | B1 | 8/2018 |
| KR | 102167436 | B1 | 10/2020 |
| KR | 102242204 | B1 | 4/2021 |

* cited by examiner

DIAPHRAGM FOR HIGH PRESSURE WATERPROOF MICROSPEAKER AND HIGH PRESSURE WATERPROOF MICROSPEAKER INCLUDING THE SAME

TECHNICAL FIELD

The present disclosure relates to a diaphragm for a high water pressure waterproof microspeaker and a high pressure waterproof microspeaker including the same.

BACKGROUND

Mobile devices are equipped with a microspeaker to reproduce a notification sound or content sound for users. In order to maximize the convenience of mobile devices, mobile devices having a water-resistance function tend to increase, and accordingly, a microspeaker itself installed in the mobile devices is also required to have a water-resistance function.

FIG. 1 is a view illustrating a waterproof microspeaker according to a related art, having a structure disclosed in Korean Patent Registration No. 10-1889315. A diaphragm body portion includes a rigid center diaphragm 11, a side diaphragm 12 which is a silicone rubber film, and a plastic support 13 coupled to an edge of the side diaphragm 12. The side diaphragm 12 includes a planar coupling portion 12*a* located at a central position, a connecting portion 12*b* located at an edge position and injection-coupled with the plastic support 13, and a bent ring portion 12*c* located between the coupling portion 12*a* and the connecting portion 12*b*. A protrusion or the bent ring portion 12*c* that is inwardly recessed is provided at an outer location of the center diaphragm 11 on the side diaphragm 12, and a distance between an outer edge of the center diaphragm 11 and an inner edge of the bent ring portion 12*c* is within a numerical range between 002 mm and 02 mm.

The center diaphragm 11 and the side diaphragm 12 are bonded through a bond, and when high pressure water is applied, bonded surfaces of the center diaphragm 11 and the side diaphragm 12 may be opened by water pressure and water may flow into a gap therebetween. Therefore, in order to improve waterproof performance, it is required to improve the adhesion performance of the bonded portions between the center diaphragm 11 and the side diaphragm 12.

SUMMARY

An aspect of the present disclosure is to provide a diaphragm for a high pressure waterproof microspeaker capable of improving waterproof performance by expanding a bonded area between a center diaphragm and a side diaphragm.

In an aspect of the present disclosure, a diaphragm for a high pressure waterproof microspeaker, which is provided in a microspeaker to reproduce sound, includes a center diaphragm and a side diaphragm including a center diaphragm attachment portion having a ring shape with a perforated center overall and attached to an outer periphery of the center diaphragm, a frame attachment portion attached to a frame, and a dome portion located between the center diaphragm attachment portion and the frame attachment portion and protruding upwardly or downwardly, wherein the center diaphragm attachment portion of the side diaphragm includes an upper attachment portion attached to an upper surface of the center diaphragm and a lower attachment portion attached to a lower surface of the center diaphragm.

Also, in another example of the present disclosure, the center diaphragm may be formed of a material having a density of 3.0 g/cm$^3$ or less.

Also, in another example of the present disclosure, the center diaphragm may be formed of a single sheet or two or more sheets laminated together.

Also, in another example of the present disclosure, the center diaphragm may be a single sheet, and irregularities are formed on the center diaphragm.

Also, in another example of the present disclosure, the side diaphragm may be formed of silicone rubber or silicone resin.

Also, in another example of the present disclosure, the side diaphragm and center diaphragm may be combined by insert injection.

Also, in another example of the present disclosure, a width of the center diaphragm attachment portion of the side diaphragm may be longer than a thickness of the center diaphragm.

In another aspect of the present disclosure, a high pressure waterproof microspeaker includes a frame, a magnetic circuit installed in the frame, a voice coil vibrating by mutual electromagnetic force with the magnetic circuit, a center diaphragm to which the voice coil is attached, and a side diaphragm including a center diaphragm attachment portion having a ring shape with a perforated center overall and attached to an outer periphery of the center diaphragm, a frame attachment portion attached to a frame, and a dome portion located between the center diaphragm attachment portion and the frame attachment portion and protruding upwardly or downwardly, wherein the center diaphragm attachment portion of the side diaphragm includes an upper attachment portion attached to an upper surface of the center diaphragm and a lower attachment portion attached to a lower surface of the center diaphragm.

Also, in another example of the present disclosure, the high pressure waterproof microspeaker may further include: a suspension supporting a lower end of the voice coil.

Also, in another example of the present disclosure, the frame may be formed by dividing an upper frame surface-fitted during injection molding and a lower frame coupled to the upper frame and allowing a magnetic circuit to be installed therein.

The diaphragm for a high pressure waterproof micro-speaker and the high pressure waterproof microspeaker provided in the present disclosure may have improved waterproof performance by attaching a side diaphragm to surround both upper and lower peripheries of the center diaphragm.

DETAILED DESCRIPTION

Hereinafter, the present disclosure will be described in more detail with reference to the drawings.

Figure 1:
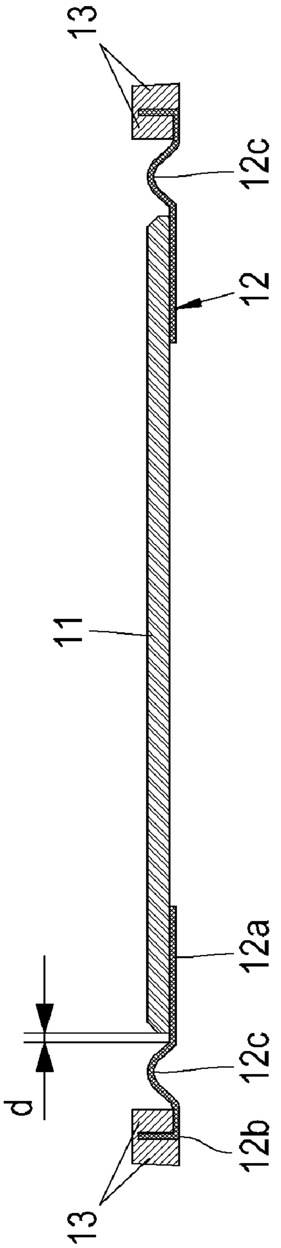
FIG. 1 (PRIOR ART)
FIG. 1 is a view illustrating a waterproof microspeaker according to the related art.
Figure 2:
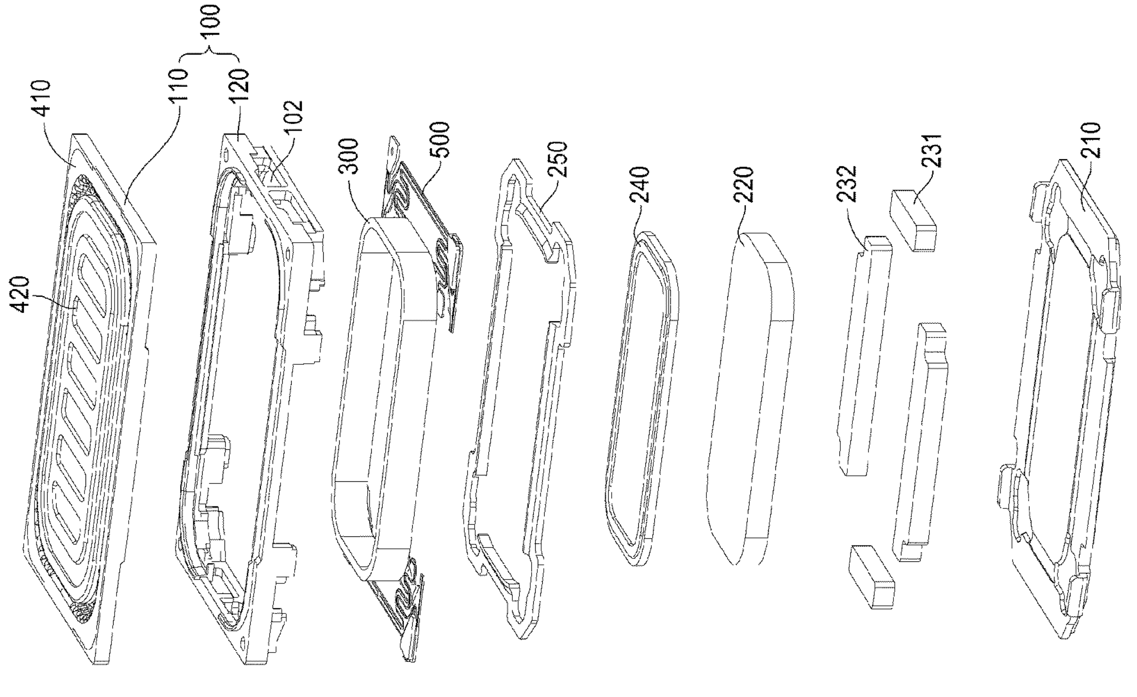
FIG. 2 is an exploded view illustrating an example of a high pressure waterproof microspeaker according to an embodiment of the present disclosure.

FIG. 2 is an exploded view illustrating a high pressure waterproof microspeaker according to a first embodiment of the present disclosure.

The configuration of the high pressure waterproof microspeaker according to the first embodiment of the present disclosure is basically the same as that of the related art. A yoke 210, an inner magnet 220, four outer magnets 231 and 232, an inner top plate 240, and an outer top plate 250 which is insert-injected into the frame 100 are installed in the frame 100. A voice coil 300 is located in an air gap between the inner magnet 220 and the outer magnets 231 and 232, and when power is applied to the voice coil 300, the voice coil 300 vibrates up and down. The voice coil 300 is attached to lower surfaces of diaphragms 410 and 420, and when the voice coil 300 vibrates, the diaphragms 410 and 420 vibrate together to generate sound. The diaphragms 410 and 420 include a side diaphragm 410 having a ring shape with a perforated center and a dome-shaped cross-section and a center diaphragm 420 attached to the center of the side diaphragm 410.

The microspeaker is generally formed to have a rectangular shape rather than a square shape, and thus has a pair of longer sides which are relatively long and a pair of shorter sides which are relatively short. In addition, the frame 100, the diaphragms 410 and 420, the voice coil 300, and a magnetic circuit, which are components, also have a rectangular shape. Accordingly, the outer magnets 231 and 232 include two short outer magnets 231 arranged to be parallel to the shorter side of the inner magnet 220 and two long outer magnets 232 arranged to be parallel to the longer side of the inner magnet 220. In addition, the outer top plate 250 attached to an upper surface of the outer magnets 231 and 232 has a single rectangular ring shape, and one outer top plate 250 is attached to all the outer magnets 231 and 232.

Meanwhile, an energized suspension 500 having both ends attached to the voice coil 300 and the frame 100 to support the voice coil 300 is attached to guide and support vibration of the voice coil 300 in order to prevent lateral vibration of the voice coil 300 and the diaphragms 410 and 420. In general, a microspeaker, in which an overall height is reduced, an area of a sound emission passage is increased, and a waterproof function is provided, may allow water to be easily drained out, and in an embodiment of the present disclosure, an inverted dome shape in which a dome of the side diaphragm 410 protrudes downwardly is adopted. In the case of the inverted dome shape, it may be difficult to apply a suspension between the side diaphragm 410 and the voice coil 300 due to interference during vibration, and thus, the energized suspension 500 may be manufactured as an FPCB to also serve to transmit an electrical signal applied from an external power source to the voice coil 300. At this time, the energized suspension 500 electrically connects the voice coil 300 and a terminal disposed on the frame 100 and, at the same time, there should be no interference with other parts, so that the energized suspension 500 is installed at the edges of the rectangular voice coil 300 and the frame 100.

In addition, in order to reduce a thickness of a device in which the microspeaker is mounted, a ventilation hole 102 is provided on the side so that there is no need to separately secure a space for ventilation below a mounting space of the microspeaker. In order to improve the performance of the microspeaker, a technology that an enclosure in which the microspeaker is installed is filled with porous particles to form a virtual back volume has already been proposed. In this case, in order to prevent the porous particles from being introduced into the microspeaker to cause noise, a filter capable of blocking inflow of the porous particles may be installed in the ventilation hole 102.

Meanwhile, as for the frame, an upper frame 110 surface-fitted to an outer periphery of the side diaphragm 410 and a lower frame 120 having a magnetic circuit installed therein may be separately formed and then coupled to form the frame.

Figure 3:
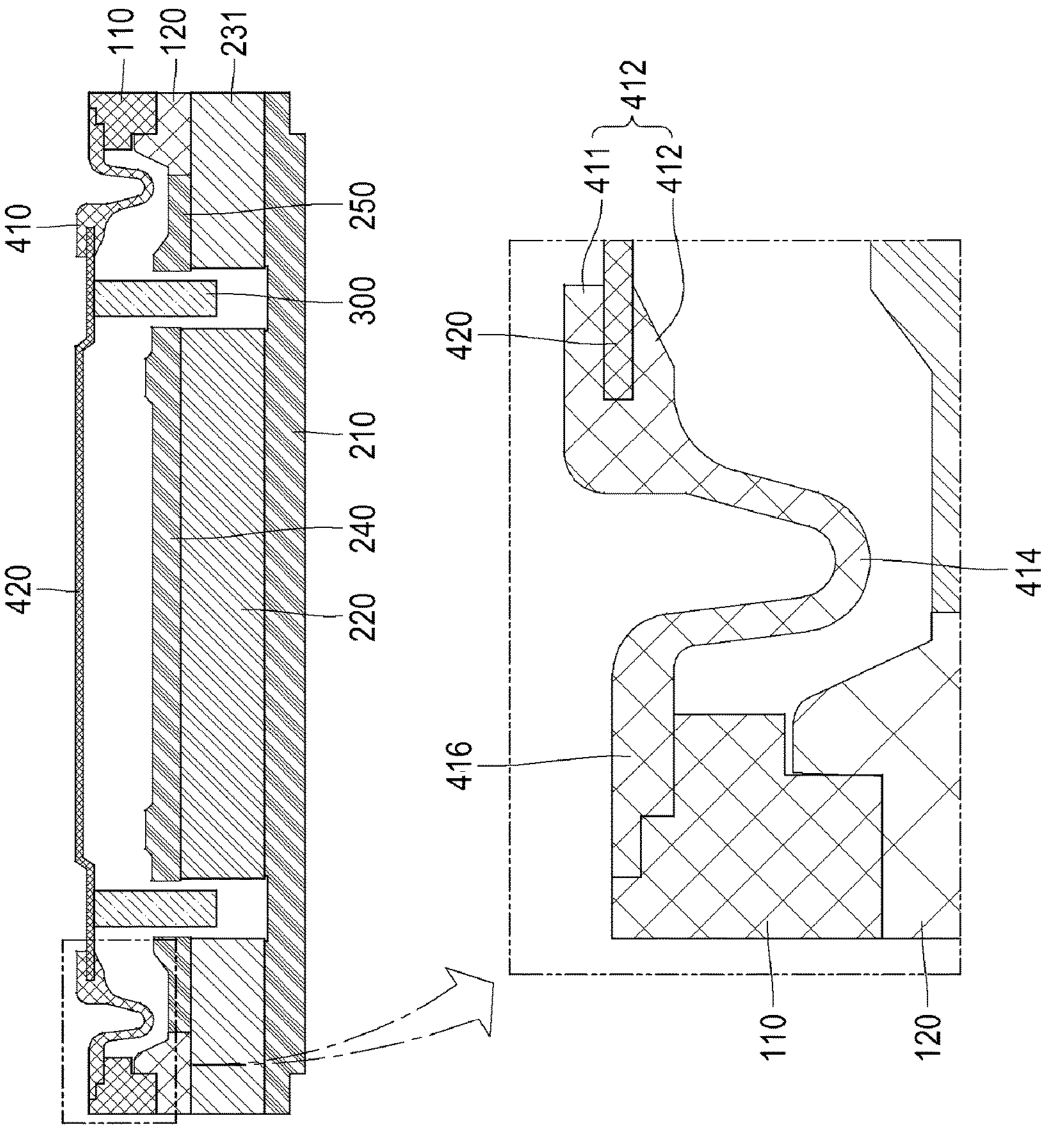
FIG. 3 is a cross-sectional view illustrating a high pressure waterproof microspeaker according to a first embodiment of the present disclosure.
Figure 4:
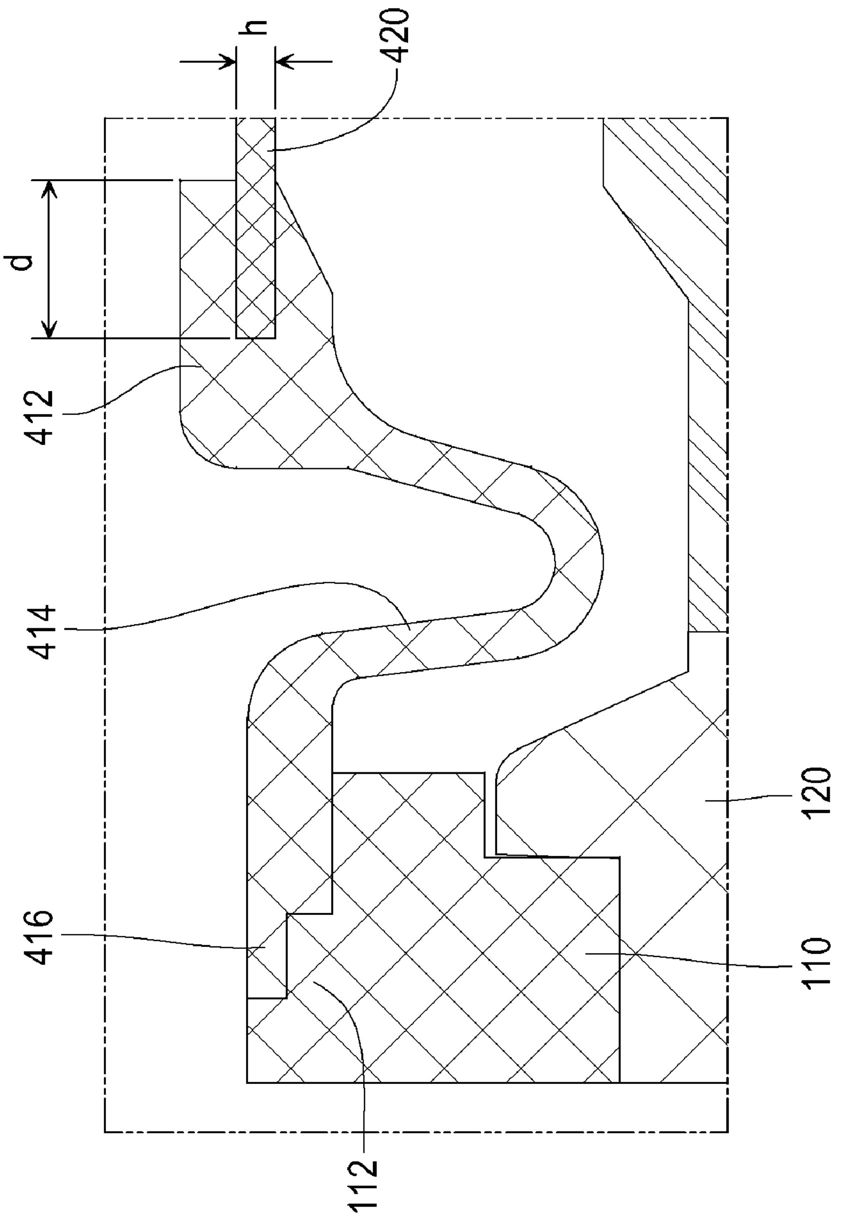
FIG. 4 is a view illustrating an attachment relationship between a side diaphragm and a center diaphragm and the side diaphragm and an upper frame of a high pressure waterproof microspeaker according to the first embodiment of the present disclosure.

FIG. 3 is a cross-sectional view illustrating a high pressure waterproof microspeaker according to a first embodiment of the present disclosure, and FIG. 4 is a view illustrating an attachment relationship between a side diaphragm and a center diaphragm and the side diaphragm and an upper frame of a high pressure waterproof microspeaker according to the first embodiment of the present disclosure.

In the high pressure waterproof microspeaker according to the first embodiment of the present disclosure, a magnetic circuit including a yoke 210, a center magnet 220, a side magnet 231, a center top plate 240, and a side top plate 250 is installed in the frame 100. The voice coil 300 is installed in an air gap between the center magnet 220 and the side magnet 231, and when a current is applied to the voice coil 300, the voice coil 300 vibrates up and down by mutual electromagnetic force with the magnetic circuit. An upper end of the voice coil 300 is attached to the diaphragms 410 and 420, and when the voice coil 300 vibrates, the diaphragms 410 and 420 vibrate together to generate sound. Although only the short outer magnet 231 is shown in the cross-sectional view, as shown in FIG. 3, the air gap is formed between all the outer magnets and the center magnet 220, and the voice coil 300 is located in the air gap.

The diaphragms 410 and 420 include a side diaphragm 410 attached to the frame 100 and a center diaphragm 420 attached to the center of the side diaphragm 410.

The side diaphragm 410 includes a frame attachment portion 416 attached to an upper surface of the upper frame 110, a dome portion 414 extending in a ring shape along the frame attachment portion 416 inside the frame attachment portion 416 and protruding upwardly or downwardly, and a center diaphragm attachment portion 412 formed inside the dome portion 414 and attached to the center diaphragm 410.

At this time, the side diaphragm 410 is attached along an outer periphery of the center diaphragm 420, and here, in order to completely surround the outer periphery of the center diaphragm 420, the side diaphragm 410 includes an upper attachment portion 411 attached to an upper surface of the center diaphragm 420 and a lower attachment portion 413 attached to a lower surface of the center diaphragm. Since an attachment area of the center diaphragm 420 and the side diaphragm 410 is increased, adhesion stability may be increased and watertightness may be improved. In this case, when the side diaphragm 410 is attached to the center diaphragm 420, a width d of the center diaphragm attachment portion 412 is preferably greater than a thickness h of the center diaphragm 420.

Meanwhile, the side diaphragm 410 is manufactured by injection molding silicone rubber or silicone resin, and the frame attachment portion 416 of the side diaphragm 410 and the upper frame 110 are inserted into a mold to be surface-fitted. The upper surface 112 of the upper frame 110 and the frame attachment portion 416 may have a step difference in order to increase bonding force.

Figure 5:
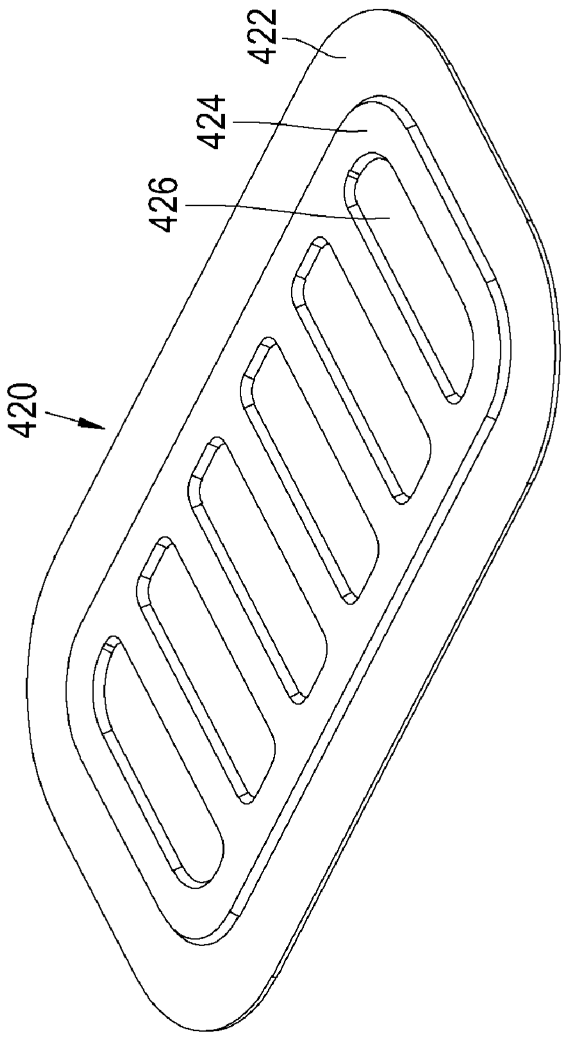
FIG. 5 is a view illustrating a center diaphragm of the high pressure waterproof microspeaker according to the first embodiment of the present disclosure.

FIG. 5 is a view illustrating a center diaphragm of a high pressure waterproof microspeaker according to the first embodiment of the present disclosure.

The center diaphragm 420 is preferably formed of a material having a density of 3.0 g/cm$^3$ or less, and the center diaphragm 420 may be formed of a single sheet or may be formed by laminating two or more sheets. In the first embodiment of the present disclosure, the center diaphragm 420 is formed of a single sheet. At this time, in order to increase the rigidity of the center diaphragm 420, the center diaphragm 420 may have irregularities.

The center diaphragm 420 includes a flat outer periphery portion 422 to which the voice coil and the side diaphragm are attached, an upper protrusion 424 protruding upwardly on an inner side of the outer periphery portion 422, and a lower protrusion 424 protruding downwardly again on an inner side of the upper protrusion 424. It has one downward protrusion 426. However, the case illustrated in FIG. 6 is only an example of a concave-convex shape, and the concave-convex shape may be any shape that may increase rigidity without impeding sound generating of the center diaphragm 420, such as a fishbone shape, a comb shape, or a lattice shape.

Figure 6:
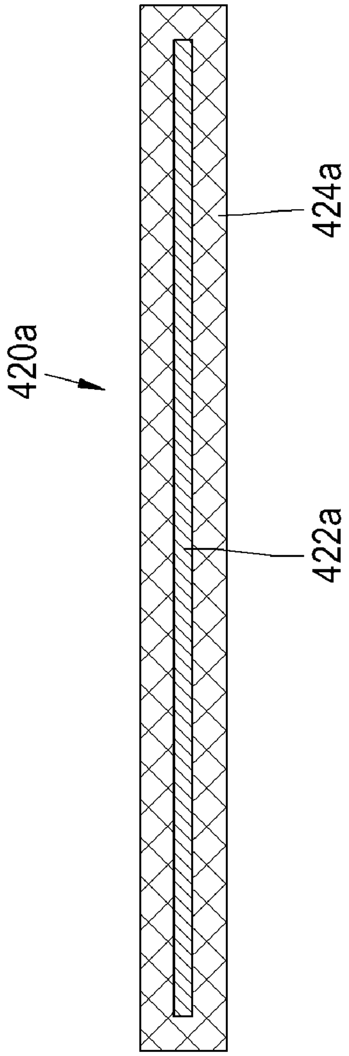
FIG. 6 is a diagram schematically illustrating a center diaphragm of a high pressure waterproof microspeaker according to a second embodiment of the present disclosure.

FIG. 6 is a diagram schematically illustrating a center diaphragm of a high pressure waterproof microspeaker according to a second embodiment of the present disclosure.

In the second embodiment of the present disclosure, a center diaphragm 420*a* is formed by laminating (stacking) several sheets. The center diaphragm 420*a* is manufactured such that a second layer 424*a* formed of a second material surrounds a first layer 422*a* formed of the first material in the center. However, layers having three or more materials may be stacked and formed, or the first layer 422*a* may be simply stacked and laminated without the second layer 424*a* surrounding the first layer 422*a*.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A diaphragm for a high pressure waterproof microspeaker, which is provided in a microspeaker to reproduce sound, the diaphragm comprising:

a center diaphragm; and a side diaphragm including a center diaphragm attachment portion having a ring shape with a perforated center overall and attached to an outer periphery of the center diaphragm, a frame attachment portion attached to a frame, and a dome portion located between the center diaphragm attachment portion and the frame attachment portion and protruding upwardly or downwardly, wherein the center diaphragm attachment portion of the side diaphragm includes an upper attachment portion attached to an upper surface of the center diaphragm and a lower attachment portion attached to a lower surface of the center diaphragm.

2. The diaphragm of claim 1, wherein the center diaphragm is formed of a material having a density of 3.0 g/cm$^3$ or less.

3. The diaphragm of claim 1, wherein the center diaphragm is formed of a single sheet.

4. The diaphragm of claim 3, wherein irregularities are formed on the center diaphragm.

5. The diaphragm of claim 1, wherein the center diaphragm is formed of two or more sheets laminated together.

6. The diaphragm of claim 1, wherein the side diaphragm is formed of silicone rubber or silicone resin.

7. The diaphragm of claim 1, wherein the side diaphragm and the center diaphragm are combined by insert injection.

8. The diaphragm of claim 1, wherein a width of the center diaphragm attachment portion of the side diaphragm is longer than a thickness of the center diaphragm.

9. A high pressure waterproof microspeaker, comprising:

a frame;

a magnetic circuit installed in the frame;

a voice coil configured to vibrate by mutual electromagnetic force with the magnetic circuit;

a center diaphragm to which the voice coil is attached; and a side diaphragm including a center diaphragm attachment portion having a ring shape with a perforated center overall and attached to an outer periphery of the center diaphragm, a frame attachment portion attached to the frame, and a dome portion located between the center diaphragm attachment portion and the frame attachment portion and protruding upwardly or downwardly, wherein the center diaphragm attachment portion of the side diaphragm includes an upper attachment portion attached to an upper surface of the center diaphragm and a lower attachment portion attached to a lower surface of the center diaphragm.

10. The high pressure waterproof microspeaker of claim 9, further comprising a suspension supporting a lower end of the voice coil.

11. The high pressure waterproof microspeaker of claim 10, wherein the frame is formed by dividing an upper frame surface-fitted during injection molding and a lower frame coupled to the upper frame and allowing the magnetic circuit to be installed therein.

* * * * *